S. & W. H. Book,
Making Fellies,
№ 14,802. Patented May 6, 1856.
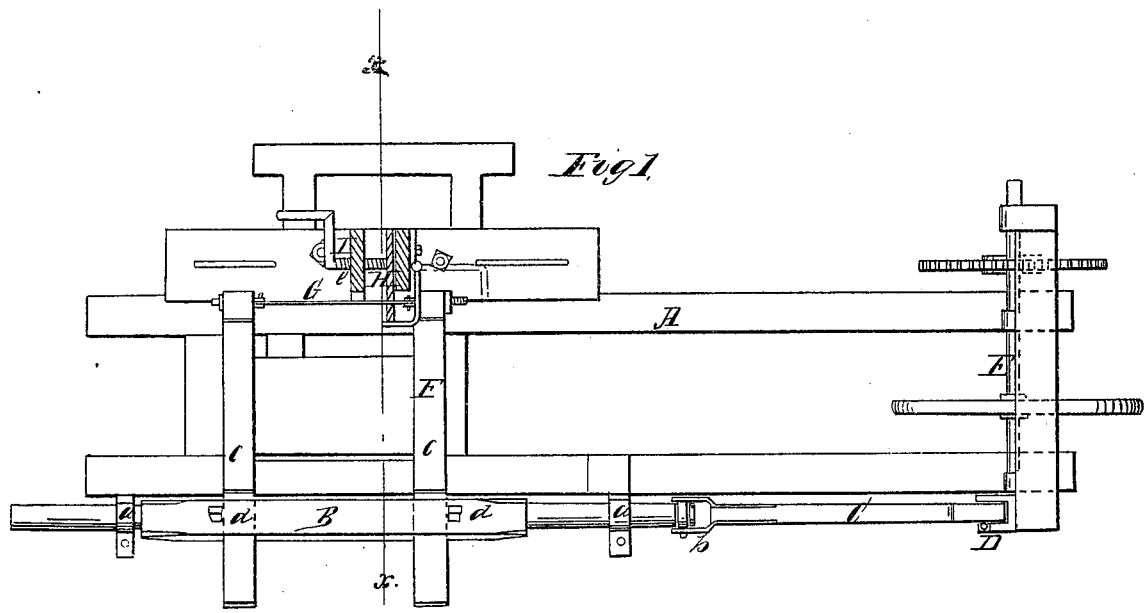
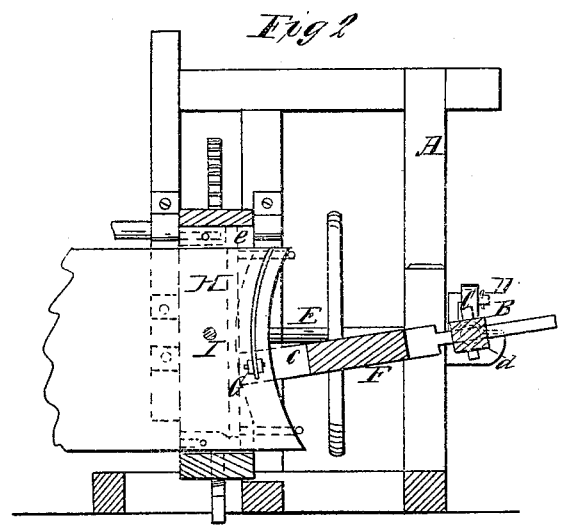

UNITED STATES PATENT OFFICE.

S. BOOK AND W. H. BOOK, OF RUSHVILLE, OHIO.

MACHINE FOR SAWING FELLIES.

Specification of Letters Patent No. 14,802, dated May 6, 1856.

*To all whom it may concern:*

Be it known that we, S. BOOK and W. H. BOOK, of Rushville, in the county of Fairfield and State of Ohio, have invented a new and Improved Machine for Sawing Fellies and other Articles of Regular Curved Form; and I do hereby declare that the following is a full, clear, and exact description of the same, reference being had to the annexed drawings, making a part of this specification, in which—

Figure 1, is a plan or top view of our improvement. Fig. 2, is a transverse section of ditto $(x)$ $(x)$ Fig. 1, showing the plane of section.

Similar letters of reference indicate corresponding parts in the two figures.

The nature of our invention consists in having a saw frame or sash attached to a horizontal shaft which is allowed to turn in its bearings, the saw sash being so attached to the shaft that it may be adjusted and allow the saw to be brought nearer to or farther from the shaft. The saw is fed to its work by the weight of the sash which operates with a reciprocating motion, the saw cutting the stuff in circular strips or in strips forming parts of a circle as will be presently shown and described.

To enable others skilled in the art to make and use our invention, we will proceed to describe its construction and operation.

A, represents the frame of the machine, constructed in any proper manner to support the working parts.

B, represents a shaft which works or slides loosely in bearings $(a)$ $(a)$ on the frame A, said shaft being also allowed to turn in its bearings. To one end of the shaft B, a connecting rod C, is attached by a universal joint $(b)$. The opposite end of the rod C, is connected to a crank D, at one end of a shaft E, on the frame A.

To the shaft B, there is attached a saw frame or sash F, the side pieces $(c)$ $(c)$ of which pass through mortises in the shaft and are secured therein by keys or wedges $(d)$. To the outer ends of the side pieces $(c)$ $(c)$ the saw G, is secured, which has its teeth so formed as to cut while moving in either direction.

To one side of the frame A, and opposite the saw sash F, there are secured two uprights $(e)$ $(e)$ between which, the "stuff" H, from which the fellies or other articles are to be sawed, is secured or clamped by a screw I. The "stuff" H, is previously sawed in proper lengths.

Operation: The outer end of the saw frame or sash F, is elevated and the "stuff" H, secured between the uprights $(e)$ $(e)$. The frame is then lowered the saw resting upon the upper end of the "stuff," motion is then given the shaft E, in any proper manner, and the shaft B, and saw sash F, works with a reciprocating motion, the saw G, cutting a strip or felly off of the "stuff" H, the strip or felly being of circular or regular curved form, or a portion of a circle of which the shaft B, is the center. The saw is fed to its work by the weight of the saw sash and the size of the strips or fellies may be varied as desired by adjusting the side pieces $(c)$ $(c)$ of the sash F, in the shaft B, so that the saw G, may be the requisite distance from the shaft.

The above machine is extremely simple, and may be constructed by any mechanic at a small cost. It has been practically tested, operates well, and is not liable to get out of repair.

Having thus described our invention what we claim as new and desire to secure by Letters Patent, is—

Hanging the saw by means of adjustable arms to a horizontal shaft, or axle, thereby allowing the saw to descend by its weight, through the circular path forming the curvature of the felly substantially as described.

S. BOOK.
WM. H. BOOK.

Witnesses:
DAVID S. MILLER,
WM. ANDERSON.